United States Patent [19]
Landis et al.

[11] Patent Number: 4,599,064
[45] Date of Patent: * Jul. 8, 1986

[54] INJECTION MOLDING APPARATUS

[75] Inventors: H. Richard Landis; Charles A. Webster, both of Oak Lawn, Ill.

[73] Assignee: Landis Plastics, Inc., Chicago, Ill.

[*] Notice: The portion of the term of this patent subsequent to Jan. 7, 2003 has been disclaimed.

[21] Appl. No.: 630,653

[22] Filed: Jul. 13, 1984

Related U.S. Application Data

[63] Continuation-in-part of Ser. No. 602,400, Apr. 20, 1980, Pat. No. 4,563,149.

[51] Int. Cl.⁴ .................................... B29C 45/22
[52] U.S. Cl. ......................... 425/185; 425/549; 425/570; 425/572
[58] Field of Search ........... 425/548, 549, 570, 572, 425/581, 185, 186, 189, 192 R, 190

[56] References Cited

U.S. PATENT DOCUMENTS

| | | | |
|---|---|---|---|
| 3,189,948 | 6/1965 | Whitney | 425/548 |
| 4,285,659 | 8/1981 | Koike | 425/570 |
| 4,376,244 | 3/1983 | Gellert | 425/549 |
| 4,422,841 | 12/1983 | Alfonsi et al. | 425/548 |
| 4,438,064 | 3/1984 | Tsutsumi | 425/549 |
| 4,501,550 | 2/1985 | Nikkuni | 425/548 |

OTHER PUBLICATIONS

UNITEMP Pamphlet (undated).

Primary Examiner—Jay H. Woo
Assistant Examiner—Timothy W. Heitbrink
Attorney, Agent, or Firm—Fitch, Even, Tabin & Flannery

[57] ABSTRACT

Apparatus for forming objects from molten material includes a mold frame and a movable mold side having complementary faces that define molding cavities. The mold frame includes a mold housing having an internally heated manifold which has a molten plastic distribution channel system for conducting molten plastic to injection nozzle passageways, each having a restricted discharge nozzle that discharges the plastic into a molding cavity. Within each injection nozzle passageway is a heater probe which has an internal heater, preferably an electrical cartridge heater. The probe is secured by an integral seating flange to the mold housing to hold the probe coaxially aligned in the injection nozzle passageway and to hold the probe against shifting with thermal expansion and contraction of the manifold. The integral rear flange is positioned in front of manifold block and has a connecting passageway that communicates the manifold distribution channel with the injection nozzle passageway. The electrical cartridge heater is substantially lower in cost than external electrical band heaters used heretofore for heating plastic flowing internally through a probe. To reduce heat transfer from the probe to the manifold, air pockets are formed into surfaces of the probe that interface with the manifold.

9 Claims, 8 Drawing Figures

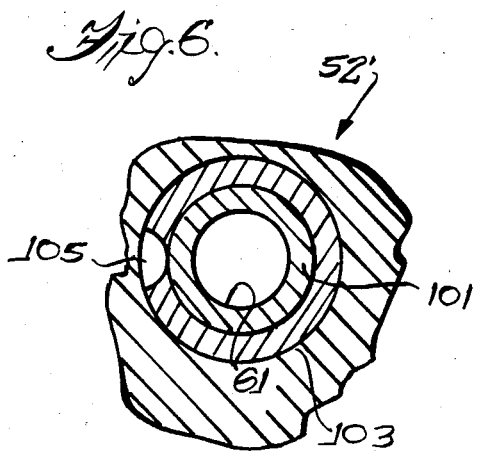
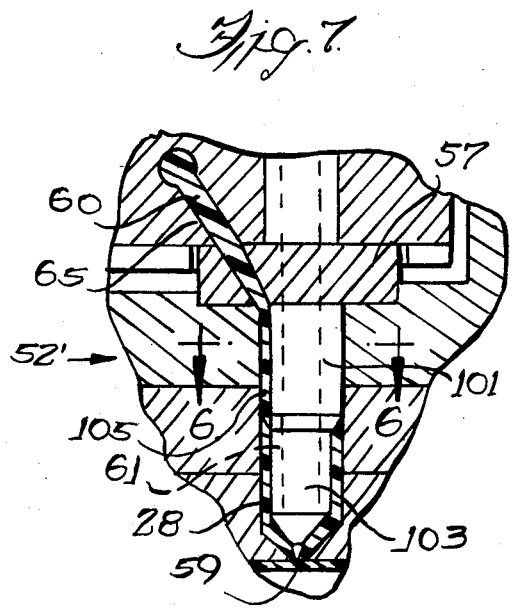
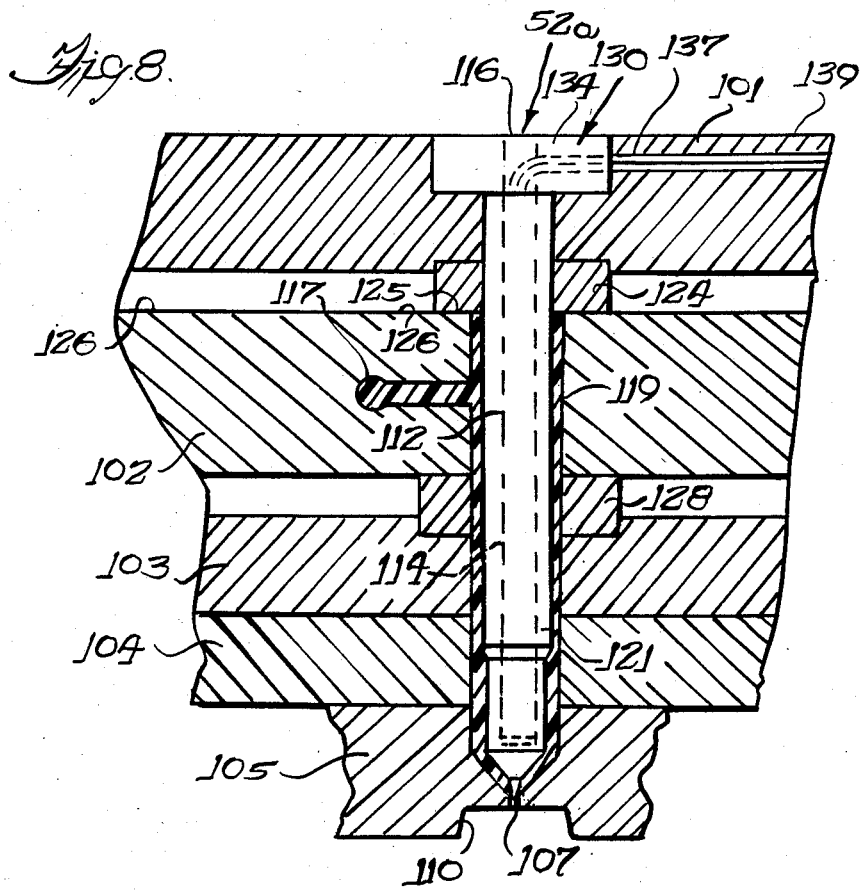

INJECTION MOLDING APPARATUS

This is a continuation-in-part application of U.S. patent application Ser. No. 602,400, filed Apr. 20, 1980, now U.S. Pat. No. 4,563,149.

The present invention relates to injection molding apparatus.

A large number of items are molded from molten material, typically thermoplastic material type or another, in molding apparatus that consists of a movable mold side and a mold frame that have complementary faces which define one or more molding cavities. Molten material is injected into the molding cavities through injection nozzles within the molding frame.

In a typical molding apparatus for simultaneously molding several articles in a plurality of molding cavities, molten material is injected into the cavities by a corresponding number of individual nozzles which are each supplied with molten plastic through a channel network of a manifold distribution block. The manifold block is disposed within a housing comprising a plurality of plates, including a front plate having passageways through which the nozzles extend.

The molten plastic is supplied to the manifold channels from a molten plastic source at a high temperature, and to keep the plastic molten and flowing, the molten plastic passageways are maintained at a high temperature by heating the manifold block and also by directly heating the nozzles. The manifold block and the channels therein are heated by resistance heating elements contained within the block itself. In an existing type of molding apparatus, the nozzles that extend from the manifold block through the front portion of the housing to the molding cavities have central hollow passageways in a probe for the flow of molten plastic, and the probe is heated by an external band resistance heater element that surrounds the probe.

The arrangement of nozzles having internal flow passageways and band heater elements surrounding the hollow probes is expensive to manufacture and to maintain. The band heater elements are quite expensive, and have a limited life. The band heaters are located inwardly of the mold base plate and manifold, thereby requiring a considerable amount of time and work for replacement, and thus, entailing a considerable expense each time they need to be replaced.

To assure adequate transfer of heat from surrounding external band heater elements to injection nozzles, the band heater elements are unprotected, and if molten plastic seeps along the side of the nozzles, the band heater element may be damaged.

Because of their relatively large size, the band heater elements do not extend along the entire length of the probe, particularly in the region of the front tip of the probe where the nozzle feeds the cavity, and as a consequence, the nozzles are made of expensive materials, such as beryllium-copper-hardened steel alloy to assure adequate transfer of heat to the front tip to keep the plastic molten. The probe tips are difficult to machine and suffer wear due to plastic flow. As stated, these band heater elements are often disposed in rather inaccessible locations within a mold half and their replacement entails considerable disassembly of the mold frame, adding to the expense of heating element replacement. In some instances, the probe tips have a plurality of narrow passageways in the tip with the plastic flowing through the passageways and the remainder of tip abuts the surrounding wall to keep the tip centered.

For efficiency of molding, it is desirable to feed as many molding cavities as possible from a single molten plastic source through a manifold. In some molding applications, it is necessary or desirable to inject plastic into a molding cavity at multiple locations that are relatively close together. Whether it is desired to inject into a number of cavities that are located close together or to multiply inject into a single cavity, the nozzles and molten material passageways should be designed for efficient utilization of space to accommodate their close proximity.

A major concern in injection molding is to keep the plastic molten through the passageways. Should the plastic cool and become spongy, the passageways will clog, resulting in loss of product and a probable need to service the molding apparatus. It is desirable to provide molten material flow passageways that are as short as possible to reduce the likelihood of plastic cooling therein. This is particularly true of the nozzle passageways where in it is more difficult to uniformly maintain the plastic at elevated temperatures than in the passageways through the manifold block.

It is desirable to minimize heat transfer from the nozzles to the manifold block. Because clogging is particularly a problem in the nozzle region, where it is difficult to maintain a uniform temperature, the nozzle heating elements may be heated to a temperature somewhat higher than the temperature at which the manifold block is maintained. Thus the manifold block may represent a heat sink with respect to the nozzle heating elements, drawing away the heat from the nozzle elements that is needed to heat the nozzle passageways.

It is a primary object of the present invention to provide new and improved molding apparatus having internally heated injection nozzles receiving plastic from a heated manifold. In particular, it is an object of the invention to provide injection nozzles which may be disposed closely adjacent to each other. It is also an object of the invention to decrease the length of the passageways through which molten plastic flows through the nozzles. It is also an object of the present invention to heat the nozzle passageways while minimizing heat transfer from the nozzle heating elements to the manifold block.

Molding apparatus according to the present invention includes a mold frame and a movable mold side which have complementary faces that together provide a plurality of molding cavities. The mold frame includes a housing consisting of several metal plates, including a mold base plate and a cavity retainer plate and also including a heated molten material distribution block or manifold behind the base plate. The heated distribution block has a channel system which distributes molten plastic to heated injection nozzles for injecting plastic into the molding cavities. The injection nozzles each include a cylindrical probe that is inserted axially into a bore extending through the housing plates from the rear of the base plate to the mold cavity. A front portion of the probe is proportioned to leave an annular channel around the probe through which molten plastic flows to a constricted orifice leading into the molding cavity, and an enlarged rear portion of the probe seats against the base plate, closing off the rear end of the passageway, thereby leaving a relatively short annular passageway thereinfront. To transfer molten material from the channel system to each annular nozzle passageway, a connecting channel extends from the rear surface of the enlarged rear portion to the front surface of the rear portion closely adjacent to the narrower front portion.

Because the distribution block is heated while the mold housing is not, the distribution block expands and contracts during heating and cooling relative to the mold housing. To accommodate its differential thermal expansion, the distribution block is proportioned and positioned within a recess or void region in the mold housing to leave an air gap on all sides. As the front portion of the heating probe cooperates with the surrounding housing bore to channel the molten material through the orifice, it is important that the heating probe remain centered relative to the bore and the orifice. Because an expansion differential exists between the distribution block and the housing, the probe is secured to the housing in alignment therewith. In addition to the air gap that is provided along the sides of the manifold block, components, which are secured to the housing plates and function to position the distribution block in a front to rear direction within the void region and which have lateral edges that face lateral edges of the manifold block, are proportioned so as to leave air gaps between the facing lateral edges to accommodate the relative shifting of the manifold block during expansion and contraction.

The enlarged rear portion of the housing has indentation means extending from the rear surface to reduce the area of the probe-manifold block interface and thereby reduce heat transfer from the probe to the manifold.

These and other objects and advantages will be more fully described in the following detailed description of the drawings in reference to the accompanying drawings of which:

Figure 5:
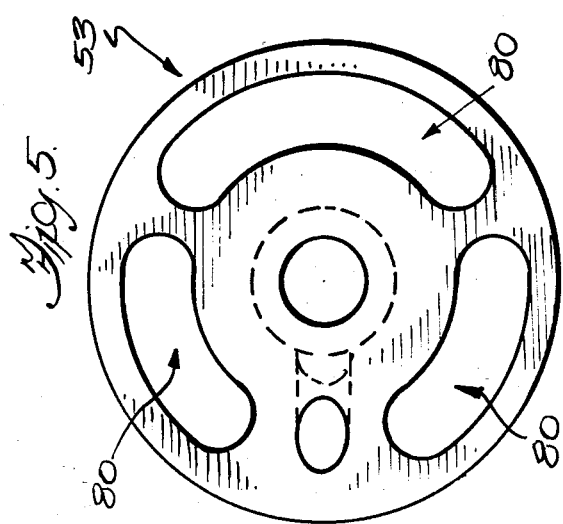
Figure 4:
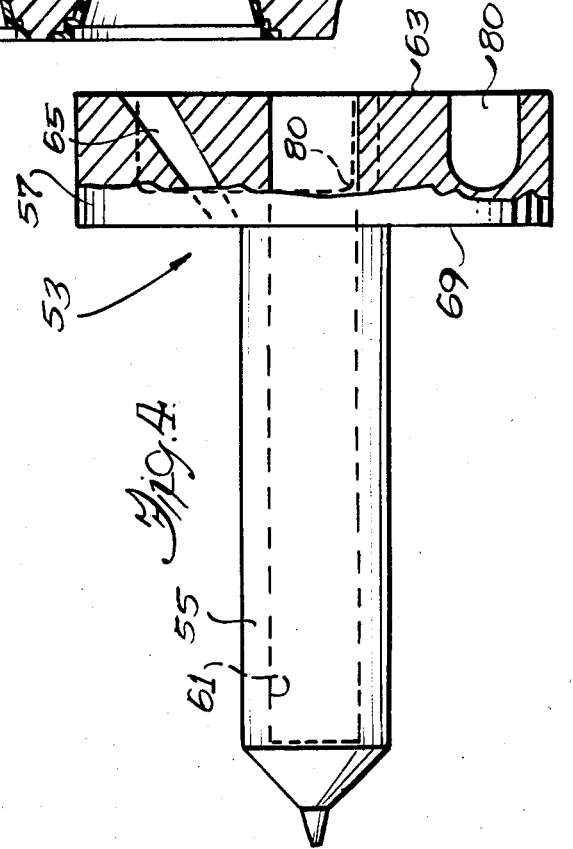

FIG. 4 in an elevation view, partially cut away, of the outer sheath of the probe shown in the preceding FIGURES;

FIG. 5 is a plan view of the probe housing of FIG. 4;

FIG. 6 is a cross-sectional view of a modified probe;

FIG. 7 is a cross-sectional view taken along line 7—7 of FIG. 6; and

FIG. 8 is a cross-sectional view of another embodiment of the invention.

Figure 1:
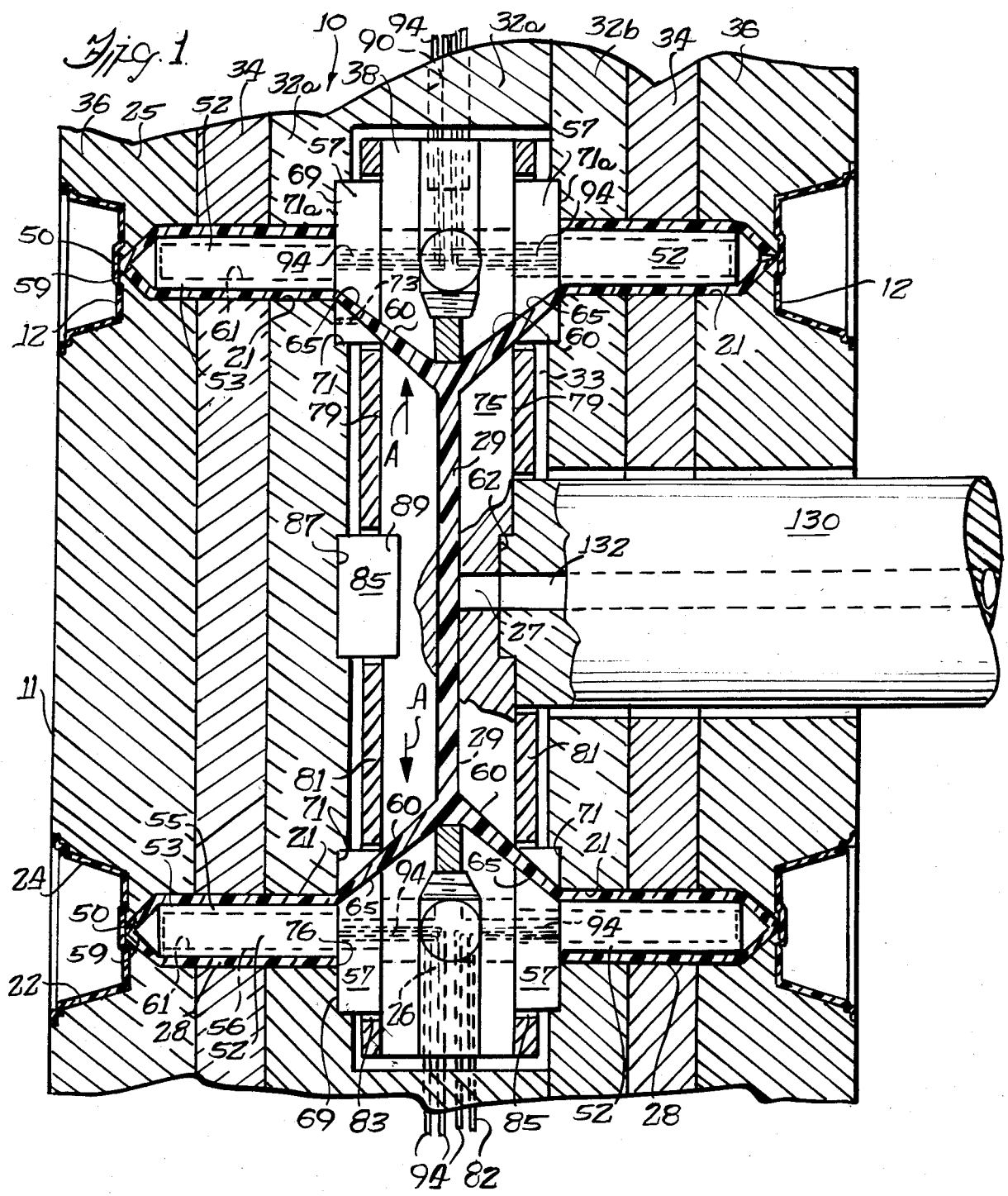
FIG. 1 is a cross-sectional view of a mold frame embodying various features of the present invention.
Figure 2:
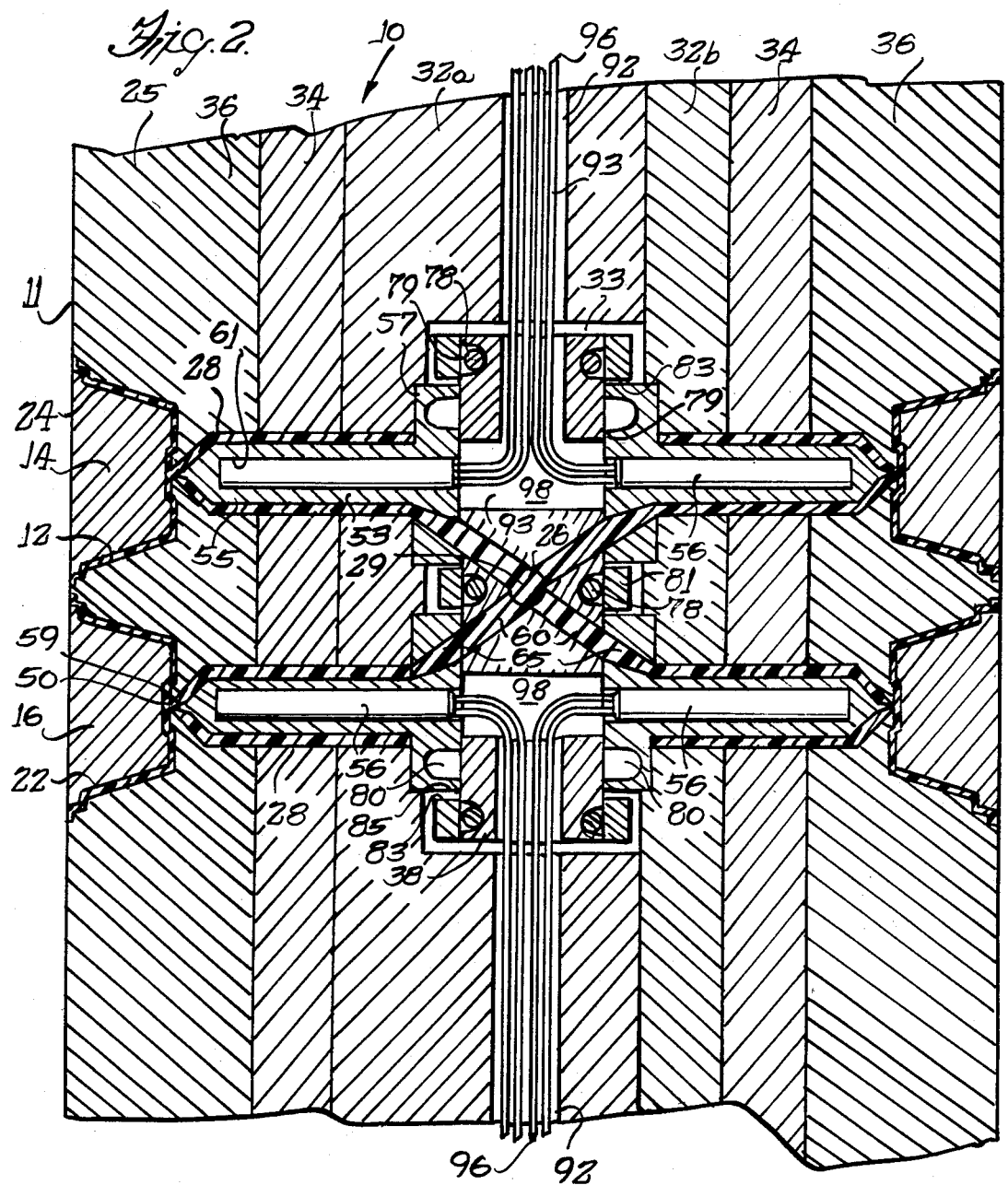
FIG. 2 is a cross-sectional view taken along line 2—2 of FIG. 1.
Figure 3:
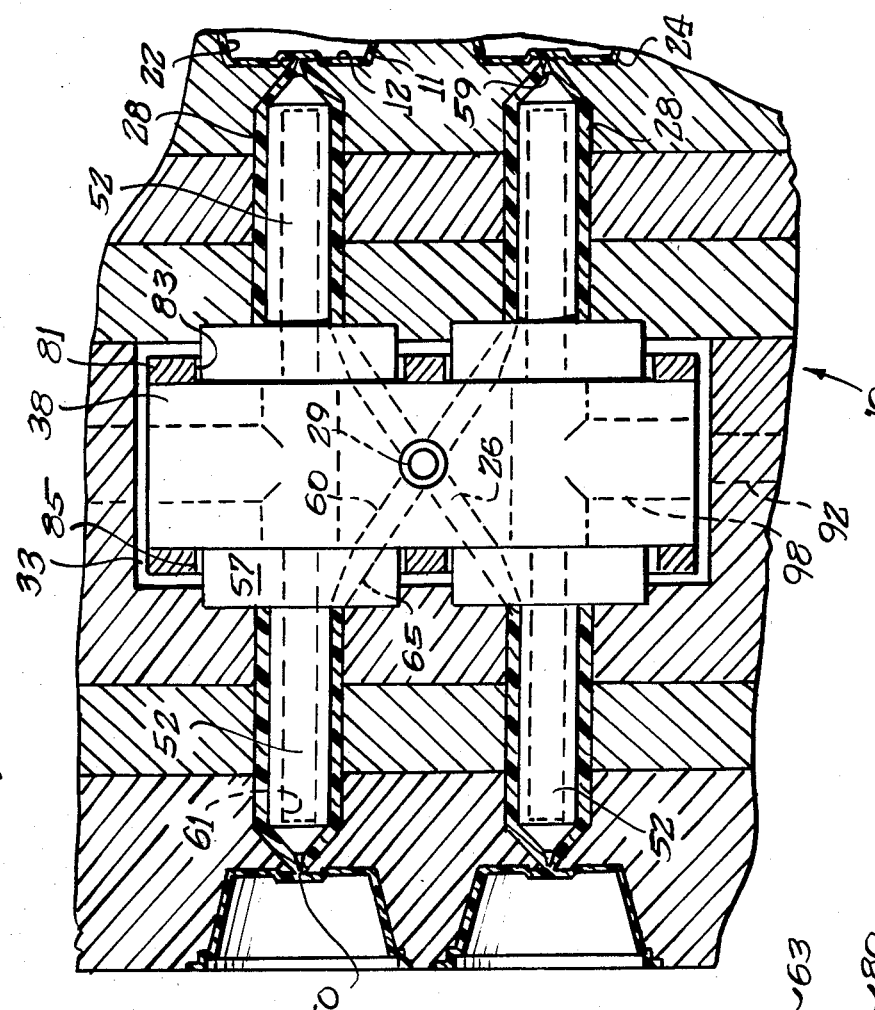
FIG. 3 is a view similar to that of FIG. 2 but with the manifold block and probes shown in elevation.

Illustrated in FIGS. 1–3 is a section of a mold half or frame 10 which has mold faces 11 with cavities or recesses 12 to cooperate with facing recesses or projections 14 on second or movable mold halves 16 to define molding cavities 22 in which objects, e.g., container covers 24 are formed by molten plastic injection molding. The illustrated mold frame 10 has a pair of mold faces 11 on each of its opposite sides to form mold cavities 22 with a pair of movable mold sides 16, increasing the number of objects that may be formed with each mold frame at one time. The mold frame 10 has a centrally located manifold block 38 with a channel system 26 therein that distributes molten plastic to individual injection nozzle passageways 28 that lead to the individual molding cavities 22. Heating means 78 (FIG. 2) in the manifold block 38 maintain the plastic material heated and in its molten state as it flows through the distribution channels 26 and into the injection nozzle passageways 28.

The mold frame 10 is comprised of a housing 25 made up of a plurality of metal plates 32, 34, 36 and the manifold block 38. The illustrated mold frame 10 is generally symmetrical with respect to a central plane with the manifold block 38 located centrally therein or rearward with respect to the molding cavities 22 at the front faces 11 of the housing. The illustrated mold frame housing 25 includes three plates on each side, including a rearward base plate 32a, 32b, a forward cavity plate 36 and a central backing plate 34 for the cavity plate. The cavity plate 36, of course, provides the molding face with the cavities 22. One of the opposed base plates 32a is much thicker than the other 32b and has a box-shaped hollow which with the rear surface of the other base plate 32b defines the box-shaped void region 33 in which the box-shaped manifold block 38 is positioned.

The manifold block 38 functions to distribute molten plastic through its channel system 26 from an inlet port fitting 130 (FIG. 1) to the individual housing passageways 28. The channel system 26 includes a short segment 27 that communicates with a channel 132 through the inlet port fitting 130, an elongated channel 29 extending at right angles in both longitudinal directions from the short segment, and a plurality of outlet channels 60 extending from the ends of the elongated channel 29 and leading to the individual nozzle passageways 28. The manifold block 38 also contains the resistance heating elements 78 (FIG. 2) that maintain the temperature of the manifold block 38 above the melting temperature of plastic.

In order to provide the individual nozzle passageways 28 that channel molten plastic from the distribution channels 26 of the manifold block, bores 21 are provided through the housing from the void region 33 to the cavities 22, extending entirely through the base, backing and cavity plates 32, 34, 36. These bores 32 are cylindrical except at their front ends where they narrow at frustoconical surfaces to the constricted orifices 50 which open to the molding cavities 22. To heat the molten plastic within the bores 21, heating probes 52 are inserted axially into the bores. The probes 52 have outer sheaths 53 including cylindrical front portions 55 proportioned to leave the individual annular passageways 28 therearound within the bores 21 and enlarged-in-diameter rear portions 57 which close off the rear ends of the injection passageways 28 through the frame housing. The front of each probe sheath narrows to a tip 59 to cooperate with the constricted orifice 50 in creating a nozzling effect thereat. The probe sheath 53 is integrally formed as a unitary metal member.

When using back to back mold cavities and back to back probes 52, it is difficult to design an effective way to use cartridge heaters in the probes and to extend the lead wires thereto and to run the plastic from the central manifold into the respective annular passageways about the respective probe bodies. This is particularly true where each of the enlarged integral rear portions 57 of the respective probes is located between the mainifold passageway and the annular probe passageway. The present invention has overcome this problem as will be described hereinafter.

Within the sheath 53 is an axial blind bore 61 extending from its rear surface 63 to closely adjacent to the tip 59 which is adapted to receive a cylindrical heating element 56, which preferably is an electrical resistance cartridge heater. A very important advantage of cylindrical cartridge heating elements 56 relative to band heaters is their substantially lower cost which may be an order of magnitude or more lower. Furthermore, cylindrical cartridge heating elements 56 extending axially from the rear of a probe sheath 53 are fully protected from the flow of molten plastic, whereas it is known that leaking plastic is a significant cause of failure of expensive band heater elements.

The plastic is injected under pressure through the passageways 132 of the port fitting 130, which extends through one of the movable halves 16 and through one half of the mold frame housing 25. A circular projection 130a on the inner end of the port fitting is inserted into a matched cylindrical socket 62 formed in the manifold block 38. In the manifold block, the plastic flows through the short segment 27 which is axially aligned with the inlet port passageway 132, through the elongated channel 29 and out through the plurality of outlet channels 60. Aligned with the ends of the outlet channels are connecting passageway segments 65 that extend through the rear portions 57 of the sheath 53, extending from the rear surface 67 and opening into the individual nozzle passageways 28. From the nozzle passageways 28, the molten plastic is discharged through the constricted orifices 50 into the cavities 22.

The use of an enlarged rear probe sheath portion 57 to close off the nozzle passageway 28 forward of the manifold block 38 and channeling of flow directly through the connecting segments 65 formed in the rear probe portions 57 represents an important aspect of the present invention. As best seen in FIG. 2, pairs of outlet channels of the manifold block angle commonly from ends of the elongated channels 29 toward the housing bores 21, and the connecting passageways 65 are also disposed at a similar angle so as to be colinear with the outlet channels. The connecting passageways 65 extend from the rear surface 63 of the rear probe housing portion 57 to the front surface 69, opening closely adjacent to the narrower front probe sheath portion 55 so as to channel molten plastic into the annular nozzle passageway 28. The outlet channels 60 and connecting passageways 65 provide a very direct route from the elongated channel 29 to the nozzle passageways 28, and the annular nozzle passageway is relative short. The short flow path to the orifice 50 reduces the likelihood that molten material will solidify in the nozzle passageway 28.

Furthermore, the colinear flow paths comprised of the outlet channels 60 and the connecting passageways 65 which angle from common ends of the elongated channel 29 are especially suitable for spacing nozzle passageways 28 as close together as required or desired. Close spacing of nozzle passageways 28 may permit more articles to be molded at one time with each mold assembly. Close spacing of the nozzle passageways is especially important in molding applications where the configuration of the mold cavity 22 indicates the use of several passageways through which molten plastic is simultaneously introduced.

In this arrangement wherein the rear portion 57 of the probe sheath 57 closes off the rear of the nozzle passageway and a relatively short bore 21 extends through the housing plates, the front portion 55 of the probe sheath 53 is correspondingly short. As the front cylindrical sheath 55 portion is relatively short, it is resistant to bending even when subjected to substantial fluid pressures.

The internally heated probe sheath 53 is directly heated substantially throughout its length by the heating element 56 which extends from the rear opening of the blind bore 61 to closely adjacent to the probe tip 59. Because each probe sheath 53 is directly heated throughout its length, it need not be made of expensive alloys, such as a copper-beryllium-hardened steel alloy, which are often used in externally heated probes to assure adequate heat conduction, e.g., to the tip 59 as well as to the connecting passageways 65.

The manifold block 38 is heated to high temperatures during molding by the resistance heating elements 78, such as Calrod heating elements, and the block expands when heated. The housing plates 32, 34, and 36 themselves are not directly heated by heating elements, and accordingly, there is slight but significant expansion and contraction of the manifold block 38 relative to the plates during periods of heating and cooling. To accommodate outward expansion of the manifold block 38 relative to the housing 25, the manifold block 38 is proportioned slightly smaller than the void region 33, leaving an air gap 82 along all sides of the manifold block. Relative shifting movement of the manifold block 38 is represented in FIG. 1 by the arrows A that show the direction of lateral shifting of the manifold block relative to the lateral sides of the housing 25 during thermal expansion.

Because the tips 59 of the probes 52 cooperate with the orifices 50 to provide a nozzling effect, it is important that the probes 52 remain centered within the housing bores 21. Because the manifold block 38 shifts during thermal expansion relative to the housing 25, the probes 52 are affixed to the housing, while provisions are made for the relative shifting movement between the probes and the manifold block. Herein the enlarged rear portions 57 of the probe sheaths 53 are received in matched-in-diameter sockets 71 in the base plates 32a, 32b that seat the probes 52 in precise axial alignment with the orifices 50. Means, such as pins 73 (FIG. 1), define a fixed rotational orientation of the probes 52 within their sockets 71, assuring that the connecting passageways 65 remain aligned with the manifold block outlet channels 60. The sockets 71 in the respective plates 32a and 32b have machined surfaces 71a, and rear portions 57 of the probe have machined surfaces 57a abutting the surfaces 71a to tightly seal the inner ends of the passageways 28 to prevent leakage of plastic at the inner ends of the passageways.

The manifold block 38 has a body 75 in which the channel system 26 is formed along its central plane. To accommodate the manifold block heating elements 78 (FIG. 2), grooves 77 are provided along its front faces 79. The elements 78 that heat the manifold block 38 are retained within the grooves 77 by face plates 81 that are attached to the body 75 by bolts or the like (not shown). The members of the frame 10 are proportioned so that the rear portions 57 of the sheaths 53, while seated in the sockets 71 and during periods of heating while molding, extend to press against to the front surfaces of the manifold block body 75. The sheaths 53 extend to the block body 75 through circular openings 83 that are formed in the face plates 81. These face plate openings 83 are larger in diameter than the rear sheath portions 57, thereby providing annular air gaps 85 that accommodate the differential shifting of the manifold block 38 during periods of thermal expansion or contraction.

While the manifold block 38 shifts relative to the housing during period of expansion and contraction, the total amount of shifting is slight. Because the shifting is slight, the alignment of the manifold block outlet channels 60 and connecting passageways 65 through the enlarged rear sheath portions 57 is maintained, providing that their respective diameters are sufficiently large. The components are machined so that the connecting passageways and outlet channels axially align at the molding temperature.

The manifold block 38 is laterally centered within the void region 33 on one side by a central bushing 85 that seats in aligned sockets 87, 89 in the larger base plate 32a and in the manifold block body 75 and on the other side by the inlet port fitting 130 that extends through the movable side, the housing 25 and into the socket 62 formed in the block body. Because the block 38 is positioned laterally from its center, differential thermal expansion proceeds uniformly in all lateral directions outward from the center.

In addition to lateral expansion of the manifold block 38, there is some relative expansion of the faces of the manifold block forward during heating; however, because the face to face dimension of the block is significantly less than its lateral dimensions, expansion in this direction is less. The thickness of the manifold block body 75 is proportioned to take account of its expansion during heating so that when heated in anticipation of molding, its faces 79 press tightly against the rear surfaces 63 of the probe sheaths 53, preventing plastic from seeping from the interface between the outlet channels 60 and the connecting passageways 65. Thus, when the apparatus is heated to the molding temperature, the manifold block 38 is centered within the void region 33 by the rear surfaces 63 of opposed probe sheaths 53. On the other hand, when the apparatus is cooled during periods of non-use, some slight spacing exists between the manifold block body 75 and the rear surfaces of the sheaths 53, resulting in a loose fit of the manifold block.

The manifold block 38 is a relatively massive metal component, and the distribution channel system 26 is surrounded on all sides by the metal; thus heat distrubtion tends to equalize within the manifold block to heat the channels generally uniformly on all sides. In the individual nozzle passageways 28; however, the annular passageways are heated only by the axial probes 52. The outside surfaces of the nozzle passageways are defined by the unheated housing plates. To assure that the molten material is adequately heated in the annular nozzle passageways 28, the heating probes are generally heated to a temperature above that at which the manifold block 38 is maintained.

As mentioned above, several advantages accrue through having the rear portion 57 of the heating probe sheaths 53 closing off the rear end of the individual nozzle passageways 28 and having connecting passageways 65 through the rear portion communicating the manifold block channel system 26 with the individual nozzle passageways. However, one problem that is presented is that the more massive manifold block 38 which is maintained at a somewhat lower temperature tends to act as a heat sink, withdrawing heat from the probes.

In accordance with an important aspect of the present invention, the individual nozzle passageways 28 are heated by the axial heating probes 52, which probes have sheathing 53 that include the front cylindrical portions 55 with diameters less than the diameter of the housing bores 21, the rear portions 57 which close off the rear ends of the nozzle passageways 28 and the connecting channels 60 through the rear portion that communicate the channel system 26 of a heated manifold block 38 with the annular nozzle passageways 28 around the heating probes 52. Each probe sheaths 53 has heat-transfer preventing means, such as air pockets 80 formed in its manifold block interfacing surface. As best seen in FIG. 5, three elongated air pockets 80 are formed in the rear surface of the rear sheath portion 57. The preferred air pockets 80 are formed by three arcuate grooves in the rear face of the rear sheath portion 57. These pockets 80 comprise more than about a third of the surface area of the interfacing sheath surface 63 and have sufficient depth, as seen in FIG. 4, to reduce the volume of the rear portion by one-fifth or more. The pockets 80 are evenly distributed around the rear surface 63 to reduce the surface area and volume to a substantial extent that is yet consistent with the structural strength of the rear probe sheath portion 57.

Formed in the larger base plate 32a and extending from the lateral sides to the void region are passageways 90, 92 through which electrical leads to the heater extend. Illustrated in FIG. 1 is a passageway 90 carrying electrical leads 94 to the manifold block body 75 for energizing the manifold block resistance heating elements 78. A threaded plug 94a (FIG. 1) seals the end of the passageway 29 from the passageway 90 and the leads 94 therein. Illustrated in FIG. 2 are a pair of passageways 92 extending through the larger base plate 32a for carrying electrical leads 96 to the cartridge elements 56. These passageways 92 align with T-shaped passageways 98 formed in the manifold block body 38 wherein the leads extend to opposed probes 52. The passageways in the manifold block and in the base plates may have a insulating material 93 (FIG. 2) therein, such as asbestos or the like, to prevent heat damage to the wires.

The movable side 16 of the mold assembly 10 will not be described in detail herein, as it is of conventional design. Briefly, the movable side 16 has the mold projections 14 and has a face which is complementary to the front face of the mold frame 10 and defines therewith the molding cavities 22 when the complementary faces are pressed against each other. In the illustrated assembly objects 24 are formed between the indentations 12 in the mold frame 10 and the projections 14 of the movable side 16.

From time to time the cartridge heating elements 56 wear out and need to be replaced. Replacement of cartridge heating elements 56 is achieved as follows. The plates 32, 34, 36 that form the housings 25 are held together by bolts (not shown). The void region 33 containing the manifold block 38 is therefore accessible by unbolting the plates and spreading the two halves of the housing 25 apart. With the halves spread apart, spent heating elements 56 may be withdrawn from the bore 61 in their sheaths 53 and new ones inserted.

In some instances, it may be desirable to have only one level of molds instead of having two levels of molds back to back as above described. In such instances, it may be desirable to shorten the length of the probe. Illustrated in FIGS. 6 and 7 is a modified version of a probe 52' having a shorter length than the probe 52, as above described. In this version a central section 101 of the probe is substantially matched in diameter to the diameter of the housing bore 21 while a front portion 103 of the probe 52' is reduced in diameter to leave the annular area 28 therearound. A groove 105 along one side of the central section 101 provides the passageway that communicates the connecting passageway 65 with the annular nozzle passageway 28.

FIG. 8 illustrates another embodiment of the invention in which a probe 52a is elongated sufficiently to extend from an outer mold base plate 101 through a central manifold plate 102 and several front plates 103, 104 and 105 to a discharge orifice 107 leading into a mold cavity 110. Such a long probe has the advantage that a cartridge heater 112 within the elongated central axial bore 114 in the probe may be removed from an end 116 of the bore without removal of any of the plates including the base plate 101. In this probe, the molten plastic flows from a central passageway 117 in the manifold block 102 into the annular passageway 119 formed about the elongated cylindrical body 121 of the probe. The plastic may flow rearwardly a short distance to a spacer ring 124 which has a machined surface 125 held tightly against the machined surface 126 of the manifold block to seal against outward flow of plastic from annular passageway 119. The spacer ring may function in the manner of the rear end of the probe as is fully described in copending patent application Ser. No. 602,400. An additional spacer ring 128 is disposed between the plate 103 and the manifold block 102 and has a central coaxial aperture aligned coaxially with the probe body to define a portion of the annular passageway 119 through which flows the plastic to reach the probe tip and the nozzle orifice 107.

The probe 52a has an integral enlarged rear base portion 130 mounted in a circular grove 131 in the base plate 101. Suitable fasteners 132 may secure the base portion 130 to the base plate 101 to hold the probe against axial movement. The probe remains centered in the axial passageway 119 by the spacer 124 which engages the probe body and by the circular sidewall 134 of the base portion 130 which abuts the circular wall 135 of the circular grove 131. The electrical leads 137 for the cartridge heater may be laid in a suitable channel 139 in the block 101. Thus, the cartridge heater 112 in the bore 114 of the probe may be removed from the probe 52a without removal of a base plate 101 or removal of several plates, as above described in connection with FIGS. 1–5.

Several advantages of the invention may now be more fully appreciated. The injection nozzles, consisting of passageway segments formed in the mold frame housing and manifold block and inexpensive internal heating probes, are much less expensive than nozzles formed of expensive heat-conducting alloys and encircled by very expensive band heating elements. Replacement of the inexpensive internal heating element is relatively simple merely requiring that a spent heating element be removed from its sheath and replaced after the frame housing plates have been unbolted and separated. The probes which have front portions that help to define annular passageways and rear portions that close off the annular passageways in front of the manifold permits relatively short probes to be used. The shortness of the probes reduces their likelihood to bend. A short passageway through the housing also reduces the likelihood that plastic will solidify therein. By extending connecting passageways through the rear portion of the probe to communicate the nozzle passageways with the manifold block channels, a relatively short flow path is provided which is well heated throughout. This arrangement leaves no passageway portions behind the probe heating element wherein plastic may begin to solidify. The short flow pathway that angles through the rear sheath portions also facilitates close spacing of adjacent nozzle passageways, which is particularly advantageous when a single complex mold cavity is injected through multiple passageways. The internal heating probe is held by the housing axially centered within the front passageway segment and with respect to the injection orifice while the manifold and its passageway segment are permitted to shift laterally relative to the probe and housing passageway segment during thermal expansion and contraction.

While the invention has been described with reference to a preferred embodiment, modifications obvious to one with ordinary skill in the art may be made without departing from the scope of the invention. For example, although the invention has been illustrated and described in terms of a two-sided mold frame, the features of the invention are readily adaptable to a mold frame having a single molding face.

Various features of the invention are recited in the following claims.

What is claimed is:

1. In a hot runner plastic injection mold assembly for producing a heated flow of plastic into a mold cavity comprising:

a mold housing comprising a plurality of mold frame plates and a mold cavity with an orifice from which discharges molten plastic into the mold cavity, a heated manifold block of one piece, integral construction disposed within said housing having manifold channels therein for distributing hot plastic, and heater receiving passageways therein, said manifold block being mounted internally within said mold frame plates and being spaced from portions thereof by clearance spaces allowing the manifold block to expand relative to said mold frame plates when plastic is passing therethrough, said mold housing having a plastic injection bore therein, a heater probe having an elongated outer sheath and a heater means disposed internally within said sheath, said sheath being disposed in said plastic injection bore and having an elongated front portion proportioned to extend to adjacent said discharge orifice leaving a surrounding passageway region in said injection bore for flow of plastic about the sheath and an integral rear portion thereon, said probe heating the plastic flowing through said surrounding region, means for securing said heater probe stationary relative to said housing during relative shifting movement of surfaces of said manifold block, and an outer plate on said mold housing having opening therein aligned with each of said heater probes and each receiving a rear portion of a heater probe therein to allow removal of said probes through said internal manifold and from said mold housing without disassembly of the mold housing.

2. An assembly in accordance with claim 1 wherein said securing means is a socket in said housing that receives said rear portion.

3. An assembly in accordance with claim 1 wherein said front portion of said sheath comprises an outer cylindrical wall and said rear portion of said sheath is enlarged relative to said front portion, said probe sheath having an axial interior chamber extending from its rear end to closely adjacent its front end, said heater means being an electrical cartridge heater inserted into said axial interior chamber to heat the cylindrical wall and thereby the plastic flowing about the external surface of said cylindrical wall.

4. An assembly in accordance with claim 1 wherein said rear sheath portion has a rear surface interfacing with said manifold block and pocket means extending into said rear portion of said sheath from said rear surface, said pockets reducing heat transfer between said sheath and said manifold block.

5. In a heated plastic injection stack mold assembly having mold cavities located back to back and receiving molten plastic from a common feed channel, said assembly comprising:
- a mold housing comprising a plurality of plates, including plates with mold cavities,
- a one-piece, integral manifold block disposed within said housing between said plates with the mold cavities and having manifold channels therein for distributing hot plastic to mold cavities in the respective plates, said manifold block having heater receiving passageways therein,
- tubular heaters within heater receiving passageways in the manifold block to heat the same,
- said manifold block being mounted internally within said mold frame plates and being spaced from portions thereof by clearance spaces allowing the manifold block to expand relative to said mold frame plates when plastic is passing therethrough,
- means defining plastic injection bores in the mold housing with discharge orifices located at the molds plates,
- a heater probe in each injection bore having an elongated outer sheath and a heater means disposed internally within said sheath, said sheath having an elongated front portion proportioned to extend to adjacent said discharge orifice leaving a surrounding passageway region with said bore for flow of plastic, and an integral rear portion on the heater probe closing off said passageway in front of said manifold block, said probe heating the plastic flowing through said surrounding region,
- means for securing said heater probe stationary relative to said housing during relative shifting movement of surfaces of said manifold block, and
- connecting passageway means in each of said rear portions allowing plastic to flow therethrough from said manifold channels to said injection passageway region, said rear portions of adjacent probes being disposed back to back on opposite sides of the manifold block which is located therebetween, said manifold block being common to the injection bores on opposite sides thereof.

6. An assembly in accordance with claim 5 having a pair of closely adjacent injection passageways, each having a discharge orifice and each receiving a heater probe therein, said channel having a common segment and a pair of outlets extending from a common point along said common channels for distributing plastic to each of said channels, each of said rear sheath portions having a connecting passageway extending from a rear surface to a front surface and closely adjacent to said front sheath portion for communicating said outlets to said injection passageways.

7. An assembly in accordance with claim 6 wherein said outlets and said connecting passageways are generaly colinear.

8. An assembly in accordance with claim 5 in which electrical leads extend through said manifold block to said heaters in said probes.

9. In a hot runner plastic injection mold assembly for producing a heated flow of plastic into a mold cavity comprising:
- a mold housing comprising a plurality of plates and mold cavity with an orifice from which discharges molten plastic into the mold cavity,
- a heated manifold block of integral, one-piece construction disposed internally within said housing plates and having manifold channels therein for distributing hot plastic,
- said manifold block being mounted internally within said mold housing plates and being spaced from portions thereof by clearance spaces allowing the manifold block to expand relative to said mold frame plates when plastic is passing therethrough,
- said mold housing having plastic injection bores therein,
- a heater probe having an elongated outer sheath and a heater means disposed internally within said sheath, said sheath being disposed in said plastic injection bore and having an elongated front portion proportioned to extend to adjacent said discharge orifice leaving a surrounding passageway region in said injection bore for flow of plastic about the sheath, said probe heating the plastic flowing through said surrounding region, said probes being elongated and substantially cylindrical and having a central axis therethrough,
- means for securing said heater probe stationary relative to said housing during relative shifting movement of surfaces of said manifold block, and
- connecting passageway means extending through said rear portion at angle with respect to the central axis of the heater probe and allowing flow of plastic therethrough from said manifold channel to said injection bore, said manifold block having openings therein aligned with the central axis of the respective probes to allow removal of the heater means through the openings and through the manifold block without disassembling of the mold assembly.

* * * * *

UNITED STATES PATENT AND TRADEMARK OFFICE
CERTIFICATE OF CORRECTION

PATENT NO. : 4,599,064

DATED : July 8, 1986

INVENTOR(S) : H. Richard Landis, et al.

It is certified that error appears in the above-identified patent and that said Letters Patent is hereby corrected as shown below:

In the Claims:
column 10, line 50 Change "opening" to --openings--.

Signed and Sealed this

Twentieth Day of January, 1987

Attest:

DONALD J. QUIGG

Attesting Officer

Commissioner of Patents and Trademarks